March 21, 1967  W. D. SYMMANK  3,310,181
STABILIZING DEVICE FOR ROLLING VEHICLES
Filed April 26, 1965  4 Sheets-Sheet 3
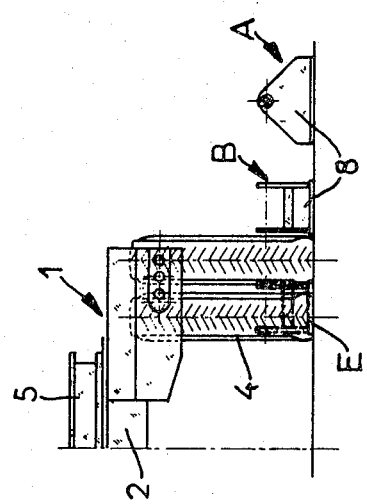
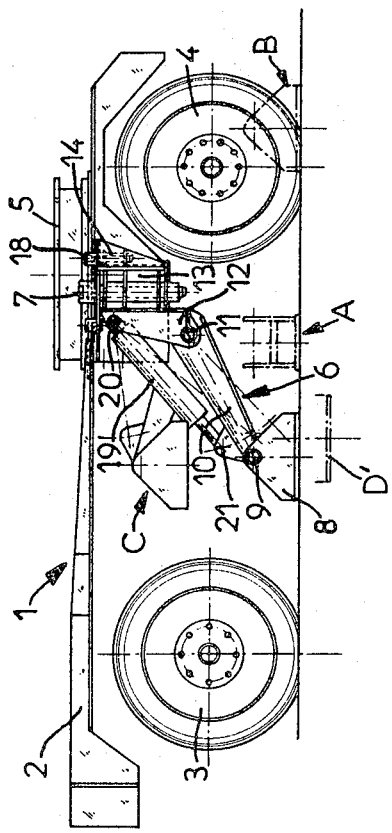
INVENTOR
WILLIAM DANIEL SYMMANK
BY
*Kenyon & Kenyon*
ATTORNEYS

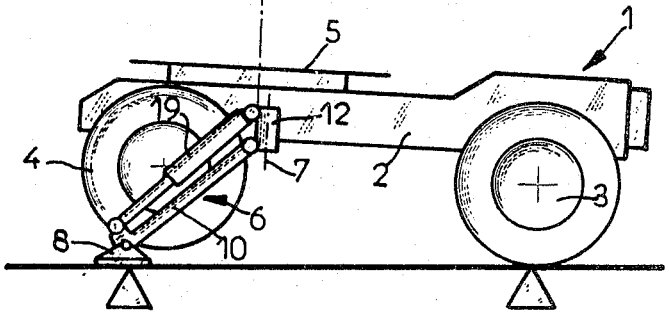
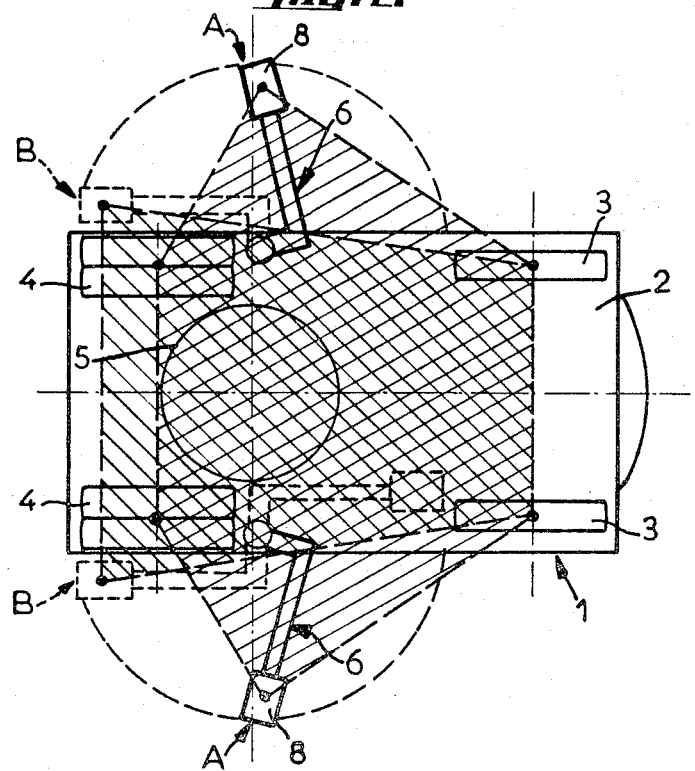

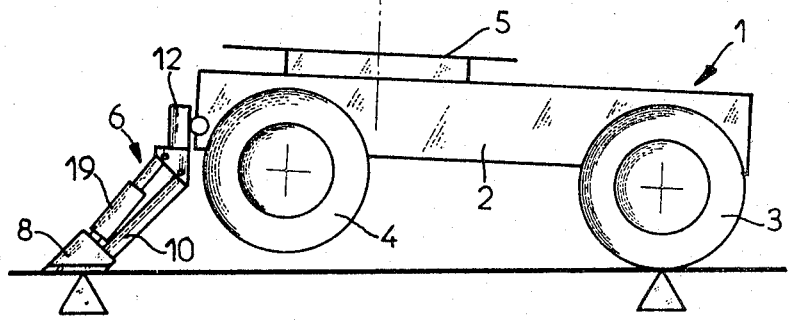
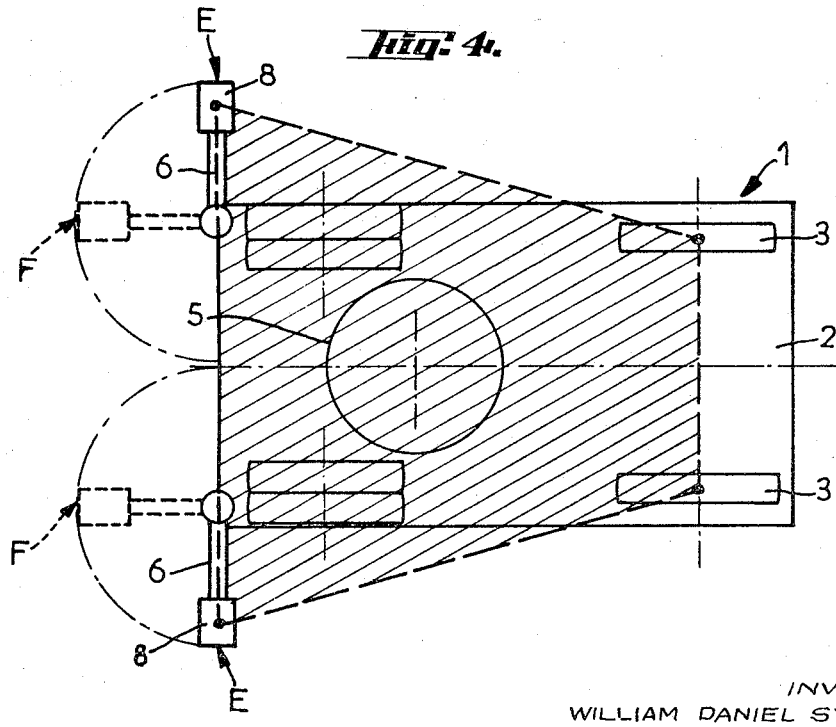

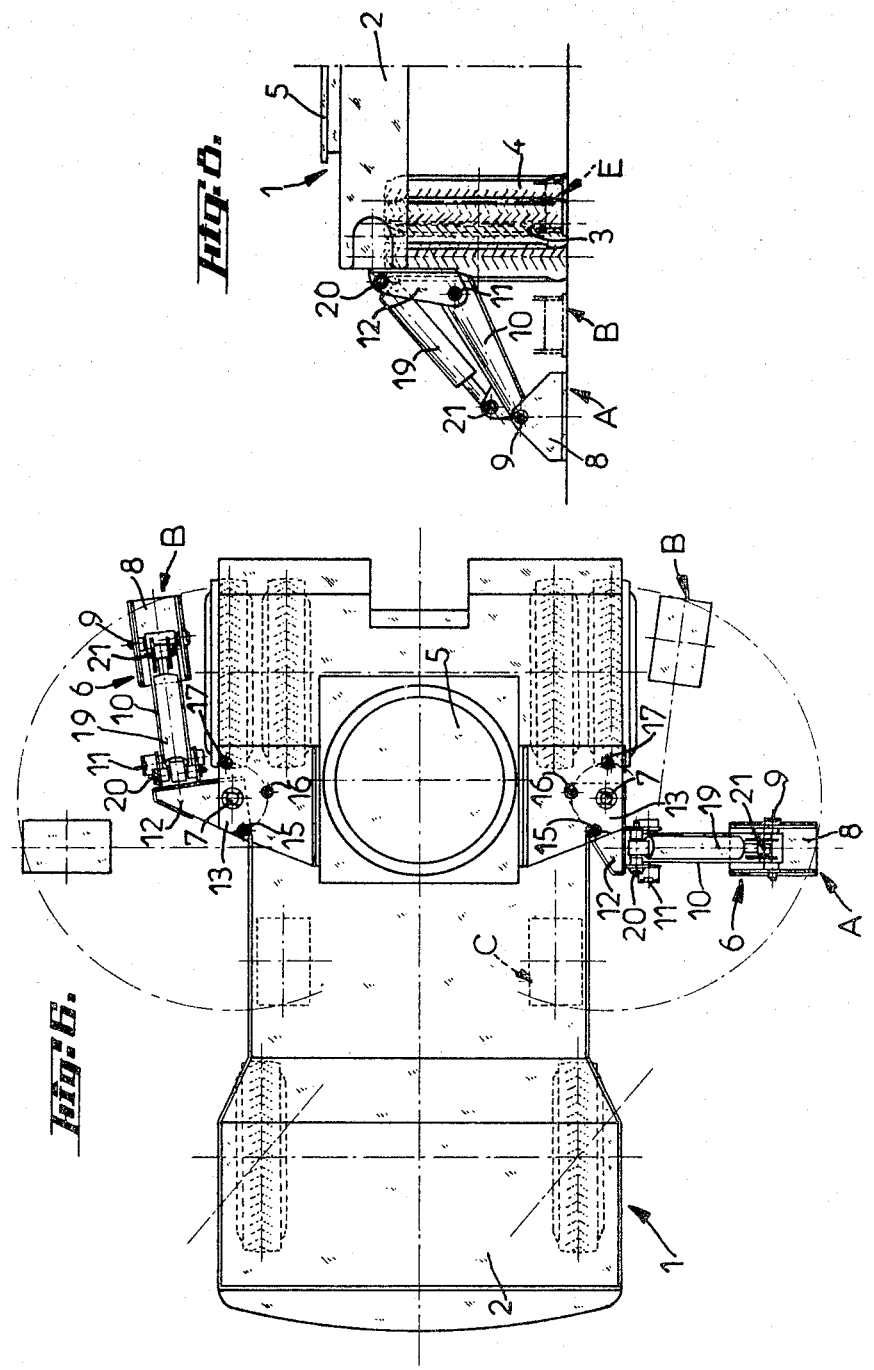

3,310,181
STABILIZING DEVICE FOR ROLLING VEHICLES
William Daniel Symmank, Lyon, France, assignor to "Yumbo," Genas, France, a corporation of France
Filed Apr. 26, 1965, Ser. No. 450,715
Claims priority, application France, Apr. 25, 1964, 972,380
6 Claims. (Cl. 212—145)

The present invention has essentially for its objects a prop-type or like stabilizing device constituting an auxiliary ground-engaging bearing support for increasing the base or efficient polygon or basis of support of a rolling vehicle at a standstill, which is adapted to withstand tilting forces tending to capsize the vehicle, as well as its various applications and the vehicles equipped with devices of this character.

It is known to equip rolling vehicles, and more particularly road vehicles, especially those intended for supporting earthmoving machines or equipment and therefore exposed to forces or stresses tending to capsize them, with stabilizing devices adapted to create auxiliary ground-engaging bearing points of support in addition to those located under the wheels, these devices consisting as a rule of a pair of lateral props or like jacking means movable in a direction parallel to a substantially vertical plane so as to be retractable or foldable to a stowed or inoperative position which does not project from the useful transport gauge. In a known type of equipment consisting of an automotive vehicle carrying a grab bucket or the like the aforesaid pair of stabilizing props disposed on either side of the frame structure of the carrier vehicle comprise each a ground-engaging shoe or skid pivoted to the outer end of an arm or the like having its opposite end pivotally connected to one side of the vehicle frame on a substantially horizontal and transverse pivot pin in relation to said frame, so that said arm may be raised or lowered parallel to the vertical longitudinal central plane of this frame. The up and down movement of each prop is controlled by means of a separate hydraulic jack having its cylinder head or bottom pivoted on the corresponding side of the longitudinal member of the vehicle frame, with the piston rod of said cylinder pivotally connected to the aforesaid prop arm. In the operative position each shoe or skid aforesaid bears on the ground between the front and rear axles or trains of wheels of the vehicle, at locations lying within the apparent horizontal contour or projection of the vehicle. The location of the bearing points of said shoes lies as a rule on a line extending across the frame in the vicinity of the transverse line of centre or of the axis of swivelling motion of the platform or rotary member supporting the equipment carried by the vehicle and disposed between said line of centre and the axis of the front axle. This known arrangement, in which the equipment mounted on the vehicle (for example a power shovel) is generally operated with a certain degree of overhang whether at the rear or laterally, is objectionable in that the base or efficient polygon or basis of support of the assembly, which is usually of trapezoidal configuration, is relatively small and in many cases inferior to the basis of support formed by the four wheels of the vehicle, notably when the front wheels are lifted off the ground so that the only bearing points consist of the two rear wheels and the two prop shoes mentioned hereinabove. Thus it will be noted that the props have a single operative position which is ill adapted to the desired result since their bearing points on the ground, between the front and rear wheels, increases the tendency of the assembly to capsize.

It is the scope of the present invention to avoid or eliminate this inconvenience and to provide props which on the one hand are retractable and do not project from the transport gauge of the vehicle and on the other hand engage the ground in the operative condition of the power shovel or like equipment, this prop assembly being adapted to increase as much as possible the basis of support of the carrier vehicle, the power shovel, whether for crowding or back-dragging, being operated mainly at the rear of the carrier vehicle, said props being further characterized in that their efficiency is preserved when the power shovel is operated as a crane on the side of the carrier vehicle.

To this end the device of this invention is remarkable notably in that each prop aforesaid is pivotally mounted on the frame structure of the vehicle so as to be adapted to revolve about a substantially vertical pivot axis, or a pivot axis extending at right angles to the plane of the platform surface of said frame, and that it lies preferably on the longitudinal side of said frame.

According to another feature of this invention, at least one pair of expansible props of the type aforesaid are provided, these props having their pivot pins disposed substantially symmetrically with respect to the longitudinal axis of the aforesaid vehicle frame, either in an intermediate position preferably adjacent to the transverse bearing line of the load carried by said vehicle, or near one end, for example the rear end, of said frame.

According to another feature of this invention, each prop is adapted to pivot approximately through half a revolution to assume at least three relative positions, namely a retracted or folded position under the frame or an unfolded service or operative position laterally or toward one end of the aforesaid vehicle, with a preferably maximum outward reach of the horizontal apparent contour of the vehicle frame in at least one service or operative position.

Each prop may thus advantageously have three positions, namely the folded position beneath the frame for on-the-road travel the rear position for operating the equipment carried by the rear portion of the vehicle, and the lateral position for operating the equipment carried on the side of the vehicle. If the props are disposed between the front wheels or train and the rear wheels or train, the weight of these props will assist, due to their position, in increasing the stability of the assembly during travels to and from the working site.

According to a further feature characterizing this invention locking means are provided for holding or locking each prop against motion in each selected angular position thereof; thus, the props may be locked in any one of the aforesaid three positions by inserting for example a suitable lock bolt or pin. Of course, the arrangement may comprise more than three positions, and if desired the complete sector covered by the permissible movement of each prop may be utilized from the stowed or road transport position, for example with the prop extending forwards, to the rearmost service position.

According to another feature of this invention, separate manual control means or servo-motor control means of the mechanical, hydraulic, pneumatic, electrical or like type are provided for actuating each prop according to at least one of its two permissible rotary motions.

The present invention is also concerned with movable equipments and vehicles equipped with devices of the type broadly set forth hereinabove and more particularly vehicles carrying handling or earthmoving equipment for hoisting, extraction, loading, levelling, navvying works, such as bucket-type power shovels, excavators, whether for crowding or back-dragging operation, mounted mainly at the rear of the carrier vehicle, dragline excavators, cranes and lifting-tong or grab-buckets adapted to operate on the side of said vehicle, or the like.

Other features and advantages of the present invention will appear as the following description proceeds with reference to the accompanying drawings showing diagrammatically by way of example typical forms of embodiment of this invention. In the drawings:

FIGURE 1 is a side elevational view showing a carrier road vehicle equipped with a stabilizing prop device according to a typical form of embodiment of this invention, the device being shown in its service condition;

FIGURE 2 is a plane view from above of the assembly of FIGURE 1, to show the basis of support in the two operative or service positions of the props;

FIGURE 3 is a view similar to FIGURE 1 but showing as an alternate form of embodiment the mounting of the device of this invention at the rear end of the vehicle;

FIGURE 4 is a plane view from above showing the assembly of FIGURE 3, the shaded area corresponding to the basis of support in the lateral service position of the props;

FIGURE 5 is another side elevational view showing on a smaller scale a rolling vehicle equipped with the device of this invention mounted in an intermediate position and illustrating its component elements and the permissible positions of the device;

FIGURE 6 is a plane view from above of the vehicle shown in FIGURE 5;

FIGURE 7 is an end view or rear view of the right-hand twin wheels of the preceding vehicle, and FIGURE 8 is an end view or front view of the right-hand side of the vehicle frame with its twin wheels.

Referring first to the form of embodiment of the invention, which is illustrated in FIGURES 1 and 2 of the drawings, the reference numeral 1 designates a rolling road vehicle comprising a frame structure 2 equipped with two axles or trains of wheels, namely a front axle 3 and a rear axle 4, the latter comprising as a rule twin wheels on each side. The frame 2 comprises generally in the vicinity of the rear carrier axle a swivelling platform or like rotary mounting 5 constituting a support and swivel means for an equipment, for example, an earthmoving equipment such as a power shovel, a crane-and-shovel equipment, or the like (not shown) the axis of rotation of this equipment lying generally intermediate the two axles or trains of wheels or the like.

In the specific form of embodiment illustrated in FIGURES 1 and 2 and 5 to 8, the device 6 according to this invention comprises on either side of the frame 2 a prop adapted to pivot about a hinge pin 7 having a lateral intermediate mounting position within the wheelbase of the vehicle, preferably adjacent the rear axle thereof. Each prop aforesaid is adapted to be either lifted, retracted and folded longitudinally beneath the frame 2 towards the front end of the vehicle, or spread, unfolded and lowered laterally to a position of maximum relative spacing from the longitudinal center line of the vehicle, and returned and lowered alongside the vehicle towards its rear end.

In the alternate form of embodiment illustrated in FIGURES 3 and 4, the prop pivot pins are mounted laterally, for example at the rear end of the vehicle frame 2 and each prop is adapted to be lifted and folded transversely inwards under the frame 2, towards the front end of the vehicle, or unfolded and lowered at the end, or as an extension of said frame, or transversely to the outside of said frame.

Referring more particularly to FIGURES 5 to 8 of the drawings it will be seen that each prop aforesaid consists of a bearing shoe or skid 8 or the like, hingedly mounted by means of a substantially horizontal pivot pin 9 or the like to the end of an arm or like member 10 of a type already known per se having its opposite end pivotally mounted by means of a substantially horizontal pivot pin 11 to a rotary bracket-forming or like support 12 rotatably mounted on the aforesaid pivot pin 7 carried by a strap or like member 13 rigid with the vehicle frame 2 and extending laterally therefrom.

The rotary bracket 12 may have in horizontal projection for example a substantially triangular configuration and comprise at least one substantially vertical lock hole or orifice 14 adapted to register in coaxial alignment with one of at least three corresponding lock holes or orifices 15, 16 and 17 formed in the relatively fixed strap 13, these lock holes or orifices being adapted to receive a lock bolt 18 for holding the bracket 12 and therefore the prop 6 respectively in each one of at least its three positions illustrated in the drawings, notably in FIGURE 6, which are position A shown in thick lines (lateral expanded position), position B shown in thick lines (rear expanded position) and position C (folded under the frame), this last position being shown by the broken line shoe contour.

The separate means for controlling the lifting and lowering of each prop 6 consists preferably of at least one compressed-fluid cylinder 19 for example of the hydraulic type, already known per se, having its ends pivotally connected respectively to the rotary bracket 12 and to the pivoted arm 10. Thus, for example, the cylinder body is pivotally attached at its bottom or head 20 to the bracket 12 and the piston rod is pivotally connected at 21 to the lower end of arm 10. The relative position of cylinder 19 lies above this arm 10 so that the cylinder acts at the same time as a strut, brace, stay or the like, to the prop 6 in the actual bearing position thereof.

FIGURES 2, 5 and 6 illustrate the various permissible positions of the bearing shoe of each prop. In the service position illustrated in FIGURES 1 and 2, with the rear wheels lifted off the ground, FIGURE 2 shows more particularly the polygon or basis of support area (shaded portion) in position A of the laterally expanded props, this polygon having in this case a hexagonal configuration substantially symmetric with respect to the longitudinal centre axis of the vehicle. The same figure shows likewise the polygon or basis of support of the assembly in the case of position B wherein the stabilizing props are expanded rearwardly; in this case, the polygon is of substantially trapezoidal configuration. In either case the other two bearing points are provided by the front wheels.

In FIGURE 5 there is shown diagrammatically at D' the lowermost position of shoe 8 which corresponds to a predetermined lateral cant of the vehicle, for example an inclination of about 11° of the front axle or train of wheels. It may also be noted that in the ground-engaging position of shoe 8 shown in thick lines in FIGURE 5 the prop is directed towards the front axle or train of wheels of the vehicle and this position may constitute an additional service position. These three bearing positions are also shown in FIGURES 7 and 8.

FIGURES 3 and 4 illustrate a modified form of embodiment wherein each prop is secured to the rear end of the vehicle, substantially adjacent to the rear corner of the frame thereof. FIGURE 4 illustrates the permissible amplitude of movement of each prop, which may provide at least two operative positions, namely, a position E (lateral outward expanded or transverse position) shown in thick lines in FIGURE 4, and a position F (expanded position at the rear of the vehicle frame shown in broken lines in FIGURE 4) and in their inoperative position the props are folded inwards in a direction parallel to the rear transverse side of the vehicle frame, for example under the latter. FIGURE 4 also illustrates the substantially trapezoidal polygon or basis of support corresponding to the operative or service position of the props extending laterally outwards, with the rear axle or train of wheels lifted off the ground.

The rear wheels of the vehicle are lifted off the ground by operating the separate cylinders 19 controlling the props 6. In the two alternate forms of embodiment illustrated, the rear expanded position of the props is used when the power shovel is operated under overhanging conditions at the rear of the carrier vehicle, in the case of a crowding or back-dragging equipment, and the lateral expanded position is utilized when the power shovel is operated as a crane with a certain degree of overhang laterally of the carrier vehicle.

Of course, this invention should not be construed as being limited by the specific forms of embodiment described and illustrated herein, which are given by way of example only and to which many modifications and variations may be brought without departing from the scope of the invention as set forth in the appended claims.

What I claim is:

1. In a rolling vehicle with a frame mounted on at least one pair of front wheels and on at least one pair of rear wheels, for carrying a movable load handling and lifting apparatus exerting, when working, tipping and tilting forces upon said vehicle at rest, at least one power-controlled retractable outrigger arrangement for stabilizing said vehicle in a stationary operating condition, comprising at least one overhung bearing means secured to one edge of said frame; an outrigger supporting bracket member pivotally connected to said bearing means so as to be rotatable through an angle up to about 180° about a substantially vertical pivot axis, said bracket member being formed with an upper attachment portion and with a lower attachment portion projecting downwards to a level below the underside of said frame and underlying said upper portion; a prop arm hingedly connected by one end to said lower attachment portion so as to be swingable upwards and downwards about a substantially horizontal pivot axis whereby said arm is swingable vertically between a raised inoperative position and a lowered, downward sloping, operative position, and also swingable horizontally between two nearly symmetrically opposite extreme positions located in vertical planes substantially parallel to said frame edge, said prop arm having a length greater than the distance of said horizontal axis to the ground and having its vertical plane of motion with respect to said bracket member radially spaced from said vertical pivot axis by such a distance that said arm is fully concealable by being folded inwards, beneath and against said frame in its stowed inoperative position; a ground engageable shoe pivoted to the outermost end of said prop arm about a substantially horizontal pin; a pressure fluid operated, reciprocating ram actuator consisting of a cylinder-and-piston assembly having its opposite ends pivoted to said upper attachment portion of said bracket member and to the outermost end of said prop arm, respectively, for raising and lowering the latter and for acting as a bracing strut; and releasable positively locking means for fastening said bracket member in any selected angular position thereof in fixed relation to said frame.

2. A device according to claim 1, wherein said bracket member has an apparent horizontal contour of substantially triangular shape and is formed with a plurality of apertures angularly spaced about said vertical pivot axis and adapted upon rotation of said bracket member to register successively in substantially coaxially aligned relationship with at least one hole provided in said bearing means for receiving a removable pin-like lock bolt entering said hole and a selected one of said apertures.

3. A device according to claim 1, comprising a revolvable platform mounted on said frame between the front and rear wheels in the vicinity of the latter for carrying said apparatus and at least one pair of said outrigger arrangements one at each of the opposite sides, respectively, of said frame, with its vertical pivot axis located intermediate of the wheel base and adjacent to the rear wheels of said vehicle thereby being next to said platform and in substantially symmetrical relationship with respect to the longitudinal vertical medial plane thereof, so that its prop arm may be firstly raised and folded longitudinally back against and below said frame towards the front end thereof in inoperative position and secondly extended sidewise outwards to an operative position of maximum angular spacing from said frame, and thirdly, extended nearly parallel to a longitudinal vertical plane against and along the associated side of said vehicle towards the rear end thereof in an operative position.

4. A device according to claim 3, comprising bearing means and a bracket member for each outrigger arrangement and wherein each bracket member has an apparent horizontal contour of substantially triangular shape and is formed with a plurality of apertures angularly spaced about its said vertical pivot axis upon rotation of said bracket member to register successively in substantially coaxially aligned relationship with at least one hole provided in each said bearing means for receiving a removable pin-like lock bolt entering said hole and a selected one of said apertures.

5. A device according to claim 1, comprising at least one pair of said outrigger arrangements at opposite sides, respectively, of said frame, a prop arm for each of said outrigger arrangements with its vertical pivot axis located adjacent to the rear corners of said frame, respectively, in substantially symmetrical relation to the longitudinal vertical medial plane thereof, so that said prop arms may be first raised and folded inwards, towards each other, beneath and transversely of said frame and secondly extended sidewise, and also endwise in substantially rearward extension, of said frame.

6. A device according to claim 5, comprising bearing means and a bracket member for each outrigger arrangement and wherein each bracket member has an apparent horizontal contour of substantially triangular shape and is formed with a plurality of apertures angularly spaced about its corresponding vertical pivot axis and adapted upon rotation of said bracket member to register successively in substantially coaxially aligned relationship with at least one hole provided in its corresponding bearing means for receiving a removable pin-like lock bolt entering said hole and a selected one of said apertures.

References Cited by the Examiner

UNITED STATES PATENTS

| 2,375,264 | 5/1945 | Wagner et al. | 212—145 |
| 2,750,204 | 6/1956 | Ohrmann | 212—145 X |
| 2,914,194 | 11/1959 | Brown | 212—145 |

EVON C. BLUNK, *Primary Examiner.*

A. L. LEVINE, M. L. AJEMAN, *Assistant Examiners.*